United States Patent [19]

Dapiran

[11] 4,045,799
[45] Aug. 30, 1977

[54] RADIO LOCATING UNIT FOR PERSONS IN DISTRESS

[75] Inventor: Fulvio Dapiran, Milan, Italy

[73] Assignee: U.S. Philips Corporation, New York, N.Y.

[21] Appl. No.: 622,775

[22] Filed: Oct. 15, 1975

[30] Foreign Application Priority Data
Oct. 17, 1974 Italy .................................. 28553/74

[51] Int. Cl.² .............................................. G01S 5/02
[52] U.S. Cl. ................................ 343/113 PT; 325/16; 325/18
[58] Field of Search ................ 343/113 R, 6.5 R, 6 R, 343/6 DF, 113 PT; 325/16, 18, 118, 4

[56] References Cited
U.S. PATENT DOCUMENTS
3,199,101  8/1965  Hansel ............................... 343/6.5 R
3,777,267  12/1973  van der Floe et al. ................ 325/16

Primary Examiner—Maynard R. Wilbur
Assistant Examiner—T. M. Blum
Attorney, Agent, or Firm—Frank R. Trifari

[57] ABSTRACT

Radio locating unit for persons in distress which unit is provided with a directional antenna whereby it can be used as active search unit by a rescuer and which is further provided with an omni-directional antenna and automatic switching means for energizing the transmitter part whereby it is used as passive unit by a person to be rescued e.g. a person buried by an avalanche.

3 Claims, 1 Drawing Figure

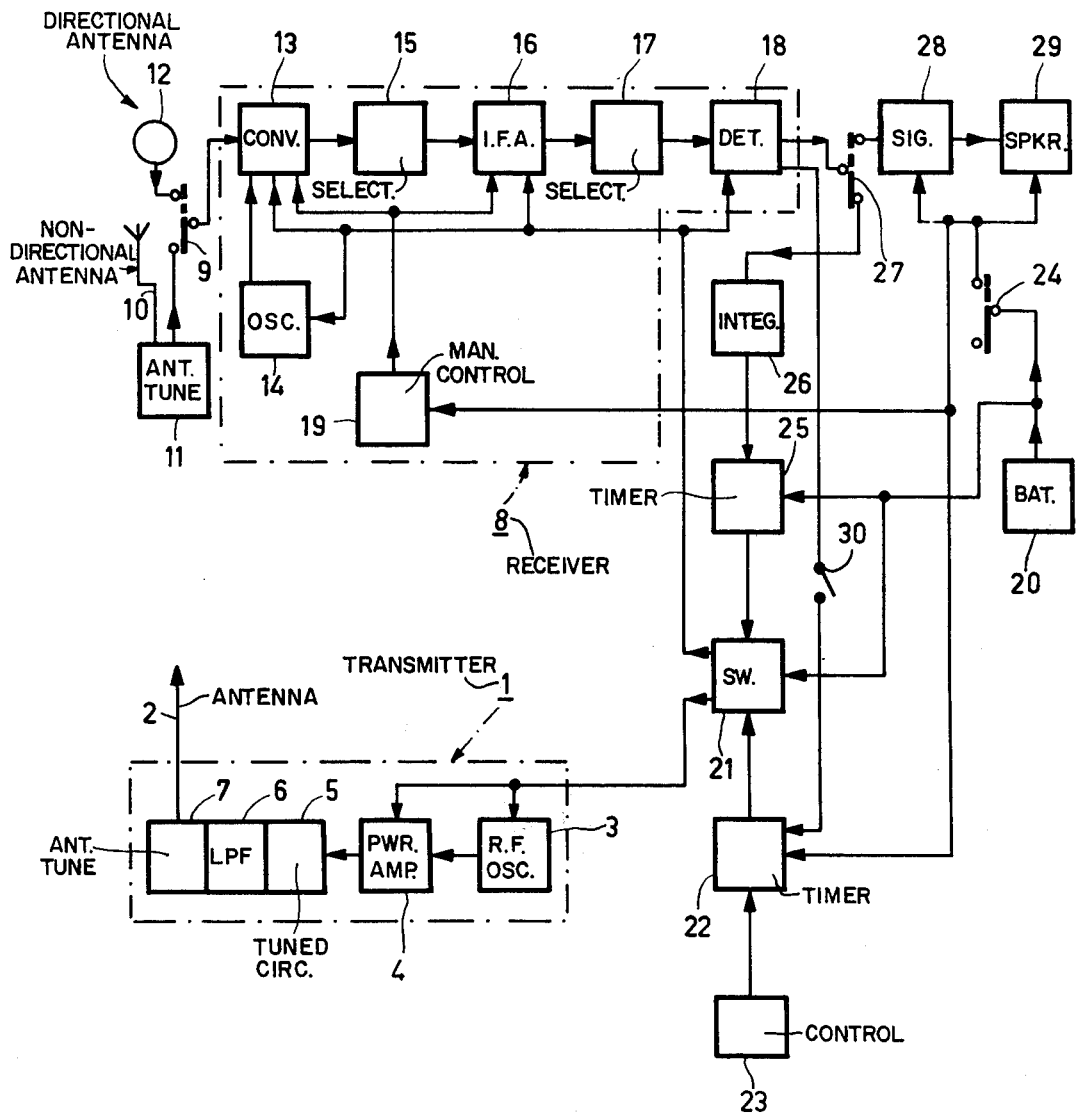

RADIO LOCATING UNIT FOR PERSONS IN DISTRESS

This invention relates to a radio locating unit for persons in distress comprising a radio signal transmitter provided with an aerial for the transmission of a radio signal with a predetermined frequency and a receiver provided with an omni-directional aerial for the receiving of signals with said predetermined frequency.

The Italian Pat. No. 950,227 disclose an apparatus for searching and locating accidentally buried persons e.g. buried under an avalanche, which comprises basically three co-acting devices, i.e. a call transmitter designed for operation by one of the rescuers to transmit radio call signals at a predetermined frequency, a transceiver or two-way radio carried by persons to be guarded, which is capable of picking up said call signals and automatically and concurrently transmits answer radio signals having the same duration as the call signals but a different frequency, and a radio direction finder which is suitable for receiving such answer signals and designed for operation by one of the rescuers, such as will track a buried person through a bearing or directional search followed by the location of such answer signal source.

The transceiver comprises in particular, in such apparatus, a receiver which is tuned to the transmitter frequency of the call transmitter, an answer transmitter to transmit answer signals at a different frequency from the call signal frequency, and an electronic change-over switch which responds to the call signals as picked up by the receiver, automatically controlling the actuation of the answer transmitter for the concurrent transmission of answer signals.

According to the Swiss Pat. No. 514,897, the transceiver unit has been provided with an electronic switch and a timer, between the receiver and the transmitter capable of responding to a short call signal as picked up by the receiver, determining immediately thereafter a temporary change over the electronic switch to the answer transmitter actuation condition and the holding thereof in such a condition over an extended time period as determined by the timer. The radio locating unit as known from the Swiss Patent uses identical transmission frequencies for the call and answer transmitters. In such a radio locating system two elements are used, i.e. an active element in possession of one of the rescuers and including the call transmitter and direction finder, and a passive element constituting the transceiver and in possession of the person to be guarded.

While this dual element type of approach has proved entirely successful in the majority of circumstances, it has met with some objections when proposed for military applications. It is in fact apparent that a military patrol on a secret mission, if swept away by an avalanche, landslide or other event that causes its members to remain buried, cannot merely call for help and rely on the assistance of any rescuers whatever, but should rather emerge from the situation in order to preserve the secrecy of their mission. On the other hand, even though one member of the patrol may, as it is logical to suppose, be equipped with the active element formed by the call transmitter and radio direction finder (or two such members be equipped respectively with a call transmitter and a radio direction finder), it may easily occur that that member of the patrol is among those buried. Hence the necessity of equipping each member of the patrol not only with the passive element but also with the active one, so that even a single man who has escaped burial suffices to search for and rescue his comrades without resorting to outside help.

Accordingly, it is an object of this invention to provide a radio locating unit, which may be utilized in military applications but, of course, in civilian ones as well, as in the case of excursion groups and incorporating means such as perform the dual role of active and passive element, while reducing the weight and dimensions thereof to acceptable limits, as also battery consumption.

The radio locating unit according to the invention is characterized in that the receiver is further provided with a directional receiving aerial and a first change over contact movable manually from a rest position, at which the receiver input is connected to the omnidirectional receiving aerial, so that the unit performs as a transceiver suitable for responding to any call signal picked up by the receiver with an answer signal automatically transmitted by the transmitter, to an emergency position at which the receiver input is connected to the directional receiving aerial so that the receiver acts as a radio direction finder suitable for picking up answer signals, whereby the transmitter acts as call transmitter and thereby permitting the search for and location of signal sources.

It will be apparent that the radio location unit according to the invention fully satisfies the requirements for which it has been designed, and in particular ensures the desired degree of self-sufficiency to military patrols on mission as well as to excursion groups and so on. Since each member of the patrol or excursion group is equipped with a unit according to the invention with its change over means (a conventional switch) in its rest position, each of such members will in practice be provided with a passive element capable of acting as an automatic transceiver in case of burial under an avalanche or otherwise, but will also be able to convert at will said passive element into an active element comprising a call transmitter and a radio direction finder, in the event that he becomes the sole member or one of a small number of members to escape from total burial. While the buried members will not have to manipulate the unit in their possession the escaped member will switch his unit to an active condition and start a search for the buried members without any need for outside assistance, so that any mission involving secrecy can be safeguarded.

It should be noted, moreover, that since it is one transmitter which acts alternately as a call transmitter and answer transmitter, and one receiver which acts alternately as a radio direction finder and transceiver receiver, the weight, size and cost of the single block unit according to the invention are notably reduced with respect to the conventional approach including two or three discrete unites. Battery consumption is also reduced owing to the fact that the emitter and receiver are never operated simultaneously.

The features and advantages of the invention will become more apparent from the following detailed description of a preferred embodiment thereof, illustrated by way of example in the attached drawing in the form of a block diagram.

The radio locating unit shown in the drawing comprises firstly a transmitter 1 of radio signals having a predetermined frequency, to the output whereof there is connected an transmitter aerial 2. Said transmitter 1 comprises in cascade connection a radio frequency oscillator 3, a power amplifier 4, a tuned circuit 5, a low-pass filter 6 and an antenna tuning circuit 7.

The same radio locating unit further comprises a receiver 8 of radio signals at said predetermined frequency, to the input whereof are alternately connectable, depending on the rest position (shown by an ordinary line) or emergency position (shown by dotted line) of a first change over contact 9, a non directional receiver aerial 10 equipped with an aerial tuning circuit 11, and a directional receiver aerial 12. The receiver 8 comprises, in cascade arrangement, a frequency converter 13 equipped with a local oscillator 14, a selector 15, an intermediate frequency amplifier 16, a selector 17, and a detector 18; furthermore, it is contemplated that a manual control set 19 be provided, whereby the converter 13 and amplifier 16 may be adjusted.

The transmitter 1 and receiver 8 are in an activated condition when the oscillator 3 and the amplifier 4 of the former and the oscillator 14, converter 13, amplifier 16 and detector 18 of the latter are enabled to receive their electric power supply from a battery 20. This is effected in an alternate way, depending on the condition wherein is found each time an electronic change over switch 21, which may be selectively controlled to change from a normal condition of activation of the receiver 8 by the power supply and of disactivation of the transmitter 1 over to a temporary condition of disactivation of the receiver 8 and of activation of the transmitter 1 by the power supply.

Temporary short duration (e.g. 1 second) switching of the electronic change-over switch 21 to the transmitter 1 activation condition are controllable through a short term or call timmer 22 equipped with a control button 23 and powered by the battery 20 when a second change-over contact 24 integral with the first contact 9 is in the emergency position shown with dotted lines in the drawing.

Temporary long duration (e.g. 15 seconds) switchings of the said electronic change-over switch 21 to the transmitter 1 activation condition are, instead, controllable through a long term or answer time 25, which is permanently connected to the supply battery 20 and has a control input connectable to the output of the receiver 8, or more exactly of the detector 18, through an integrator 26 and, when in the rest position shown by ordinary lines in the drawing, a third change-over contact 27 integral with the first and second change-over contacts 9 and 24, and manually operated together with the latter contacts.

The unit shown in the drawing further comprises a signalling means 28 equipped with a loudspeaker 29, which is connectable through the third change-over contact 27 (when in the emergency position) to the output of the receiver 8 detector 18 and through the second change-over contact 24 (when in the emergency position) to the battery 20 (together with the manual control set 19 of the receiver 8).

Lastly, the unit shown in the drawing comprises a connection between one output of the receiver 8 detector 18 and one control input of the timer 22, which connection, when completed by closing a switch 30, enables the receiver 8 to control automatically the actuation of the timer 22 when the detector 18 detects the end or termination of a signal till then picked up by the receiver 8.

The unit shown in the drawing can operate in two different ways, i.e. as a passive element and as an active element, depending on whether the change-over contacts 9, 24 and 27 are maintained in their rest or emergency positions. When such change-over contacts are in their rest position, as will invariably occur whenever the person equipped with the unit is on the move, and accordingly also in the event that said person is buried under an avalanche or whatever, to the input and output of the receiver 8 there are connected respectively, through the aerial tuning circuit 11, the non-directional receiving aerial 10, and through the integrator 26, the long term timer 25. In this situation, the unit is enabled to operate as a transceiver, i.e. as a passive element which, through the receiver 8, is capable of picking up short duration radio signals at a predetermined frequency, and through the transmitter 1 subsequently activated by temporary switching of the electronic change-over switch 21 for a time period determined by the timer 25 brought into operation by the receiver 8 through the integrator 26, is capable of retransmitting automatically immediately afterwards, corresponding long duration signals with the same frequency as the receiver signals. On the contrary, when the change over contacts 9, 24 and 27 are moved to their emergency position as shown by dotted lines in the drawing (which only becomes possible if the person equipped is able to effect movements, i.e. is not buried), to the input and output of the receiver 8 there are connected respectively the directional receiving aerial 12 and the signalling means 28 and related loudspeaker, and moreover the battery supply is passed to the short term timer 22. In this situation, the unit is enabled to operate alternately as a call transmitter (by depressing the button 23, the timer 22 controls, through the electronic change-over switch 21, the temporary activation of the transmitter 1 for the transmission of a short duration radio signal having a predetermined frequency), or as a radio direction finder capable of picking up any radio signals with said predetermined frequency, and effecting the searching for and location thereof by suitable orienting the directional aerial 12; if the switch 30 is closed, the unit is also capable of ensuring an automatic repetition of the transmission of short duration signals whenever the detector 18 detects the termination of the signal received until that moment. In this case the unit behaves as an active element.

It will be apparent from the foregoing how a unit such as the one illustrated in the drawing can offer to the members of a military patrol or excursion group who escaped being buried under the avalanche or whatever the possibility of carrying out a search for, and issuing, their buried comrades without any necessity for resorting to outside help. While the buried members will have their units with the change-over contacts 9, 24 and 27 in their rest positions and thus set to behave as transceivers, the escaped persons (and one will suffice) may move said change over contacts to their emergency position, thus availing themselves of both functions, as a call transmitting radio direction finder. By depressing the button 23, they will cause the transmitter 1 to transmit short duration call signals, which the receiver 8 of the buried units will pick up and pass to the long term timer 25, so that the transmitter 1 of the buried units will transmit automatically corresponding long duration answer signals; the latter will be picked up by the receiver 8 of the escaped units, which, behaving as radio direction finders, will permit a search for the buried persons to be started and carried out by tracking and locating the answer signal sources. If desired, it will be possible to effect an automatic repetition of the short call signals at the end of the long answer signals as they are being received, by closing the switch 30 and utilizing accordingly, in the units acting as active elements, the connection provided between the output of the receiver 8 and the control input of the timer 22.

What is claimed is:

1. A radio locating unit for persons in distress comprising a radio signal transmitter provided with an aerial for the transmission of a radio signal with a predetermined frequency and a receiver provided with an omni-directional aerial for the receiving of signals with said predetermined frequency, characterized in that the receiver is further provided with a directional receiving aerial and a first change-over contact movable manually from a rest position at which the receiver input is connected to the omni-directional receiving aerial, so that the unit performs as a transceiver suited to respond to any call signal picked up by the receiver with an answer signal automatically transmitted by the transmitter, to an emergency position at which the receiver input is connected to the directional receiving aerial so that the receiver acts as a radio direction finder adapted to pick up answer signals, whereby the transmitter acts as call transmitter and thereby permitting the tracking and location of signal sources.

2. A radio locating unit as claimed in claim 1, characterized in that it comprises a power supply, a short term timer coupled to said power supply by a second change-over contact which timer is provided with a control button, a long term timer connected to the power supply provided with a control input coupled to the receiver output by a third change-over contact, an electronic change-over switch control inputs of which are connected to said timers and outputs of which are coupled to supply inputs of the receiver and the transmitter so that the actuation of the timers causes the change-over of the change-over switch, for durations differently established by the two timers, from a normal condition of activation of the receiver by the power supply and of disactivation of the transmitter, to a temporary condition of disactivation of the receiver and of activation of the transmitting by the power supply for the broadcasting of short or long duration radio signals according to which timer is the actuating one, a signalling means connectable to the receiver output by the third change-over contact, a supply input of the signalling means is coupled by the second change-over contact to the power supply for connecting the signalling means to the output of the receiver and to the power supply in the emergency position of the unit.

3. A radio locating unit according to claim 2, characterized in that it comprises automatic repetition means of the activations of the transmitter for transmitting short duration call signals, which means is composed of an electrical connection between the receiver output and a control input of the short term timer, which connection will cause the actuation of the short term timer every time the receiver detects the cessation of a long duration answer signal received till that moment.

* * * * *